(12) United States Patent
Burkhard et al.

(10) Patent No.: US 11,852,817 B2
(45) Date of Patent: Dec. 26, 2023

(54) CURVED WAVEGUIDE FOR SLIM HEAD UP DISPLAYS

(71) Applicant: MERCURY MISSION SYSTEMS, LLC, Andover, MA (US)

(72) Inventors: Wesley Burkhard, Long Beach, CA (US); Kangbin Chua, Torrance, CA (US); Alexander Naumov, Redondo Beach, CA (US); Robert Waldo, Torrance, CA (US); Ninad Patnekar, Torrance, CA (US); Ranjit Pradhan, Rancho Palos Verdes, CA (US); Andrew Kostrzewski, Garden Grove, CA (US)

(73) Assignee: MERCURY MISSION SYSTEMS, LLC, Andover, MA (US)

( * ) Notice: Subject to any disclaimer, the term of this patent is extended or adjusted under 35 U.S.C. 154(b) by 77 days.

(21) Appl. No.: 17/376,018

(22) Filed: Jul. 14, 2021

(65) Prior Publication Data
US 2022/0019082 A1  Jan. 20, 2022

Related U.S. Application Data

(60) Provisional application No. 63/051,518, filed on Jul. 14, 2020.

(51) Int. Cl.
*G02B 27/01*  (2006.01)
*G02B 6/35*  (2006.01)

(52) U.S. Cl.
CPC ....... *G02B 27/0172* (2013.01); *G02B 6/3504* (2013.01); *G02B 2027/011* (2013.01); *G02B 2027/013* (2013.01); *G02B 2027/0181* (2013.01)

(58) Field of Classification Search
CPC ........ G02B 2027/011; G02B 2027/013; G02B 2027/0181; G02B 27/0172; G02B 27/0101; G02B 6/3504
See application file for complete search history.

(56) References Cited

U.S. PATENT DOCUMENTS

| 10,078,217 | B2 * | 9/2018 | Hayashi | G02B 27/0101 |
| 11,480,788 | B2 * | 10/2022 | Popovich | G02F 1/29 |
| 2017/0209213 | A1 * | 7/2017 | Binun | A61B 18/201 |
| 2019/0197790 | A1 * | 6/2019 | Lan | G06T 19/006 |

(Continued)

FOREIGN PATENT DOCUMENTS

| CN | 104656258 A | * | 5/2015 | ......... G02B 27/0101 |
| CN | 112074781 A | * | 12/2020 | ........... G02F 1/1334 |

(Continued)

*Primary Examiner* — Thomas A Hollweg
*Assistant Examiner* — Mary A El-Shammaa
(74) *Attorney, Agent, or Firm* — Sheppard, Mullin, Richter & Hampton LLP

(57) ABSTRACT

A waveguide can include a first portion configured to confine an input beam within the structure of the waveguide, and a second portion configured to collimate the beam to be projected through a combiner, to produce an image in infinity. A method of constructing an optical system for a head-up-display can include shaping a first waveguide element such that a first portion of the waveguide is configured to confine an input beam within the structure of the waveguide, and a second portion is configured to collimate the input beam. The method can include coupling the waveguide to a combiner.

20 Claims, 8 Drawing Sheets

(56) References Cited

U.S. PATENT DOCUMENTS

2020/0183158 A1* 6/2020 Peng .................. G02B 27/4205
2020/0319462 A1* 10/2020 Schneider ............ G02B 27/144

FOREIGN PATENT DOCUMENTS

| CN | 112987310 A * | 6/2021 | ......... G02B 27/0081 |
| WO | WO-2011110616 A1 * | 9/2011 | ............... G21K 1/06 |
| WO | WO-2015081313 A2 * | 6/2015 | ............. G02B 17/08 |
| WO | WO-2016113534 A1 * | 7/2016 | ......... G02B 27/0101 |
| WO | WO-2019140405 A1 * | 7/2019 | ............. A61B 3/032 |
| WO | WO-2020212682 A1 * | 10/2020 | ......... G02B 17/0856 |
| WO | WO-2022099312 A1 * | 5/2022 | |

\* cited by examiner

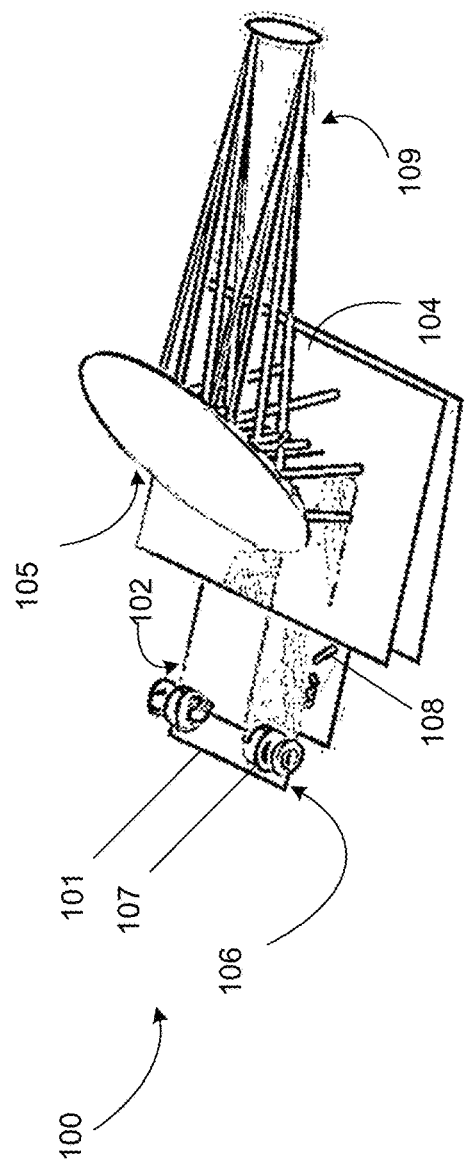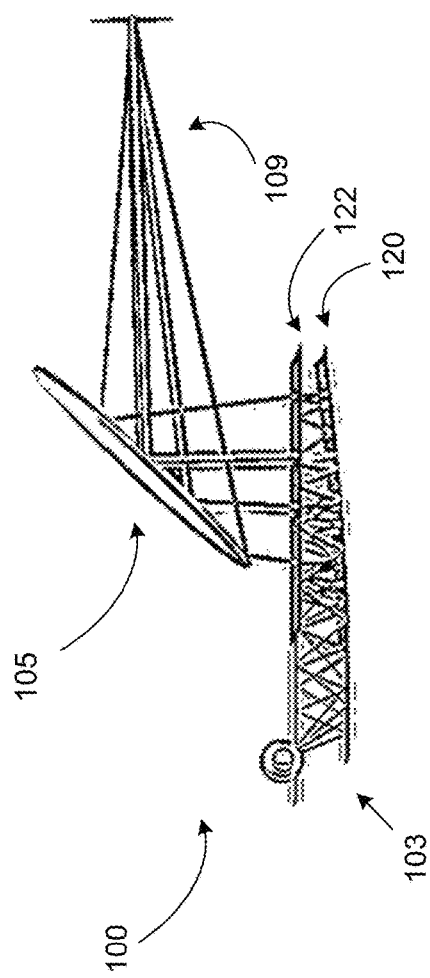

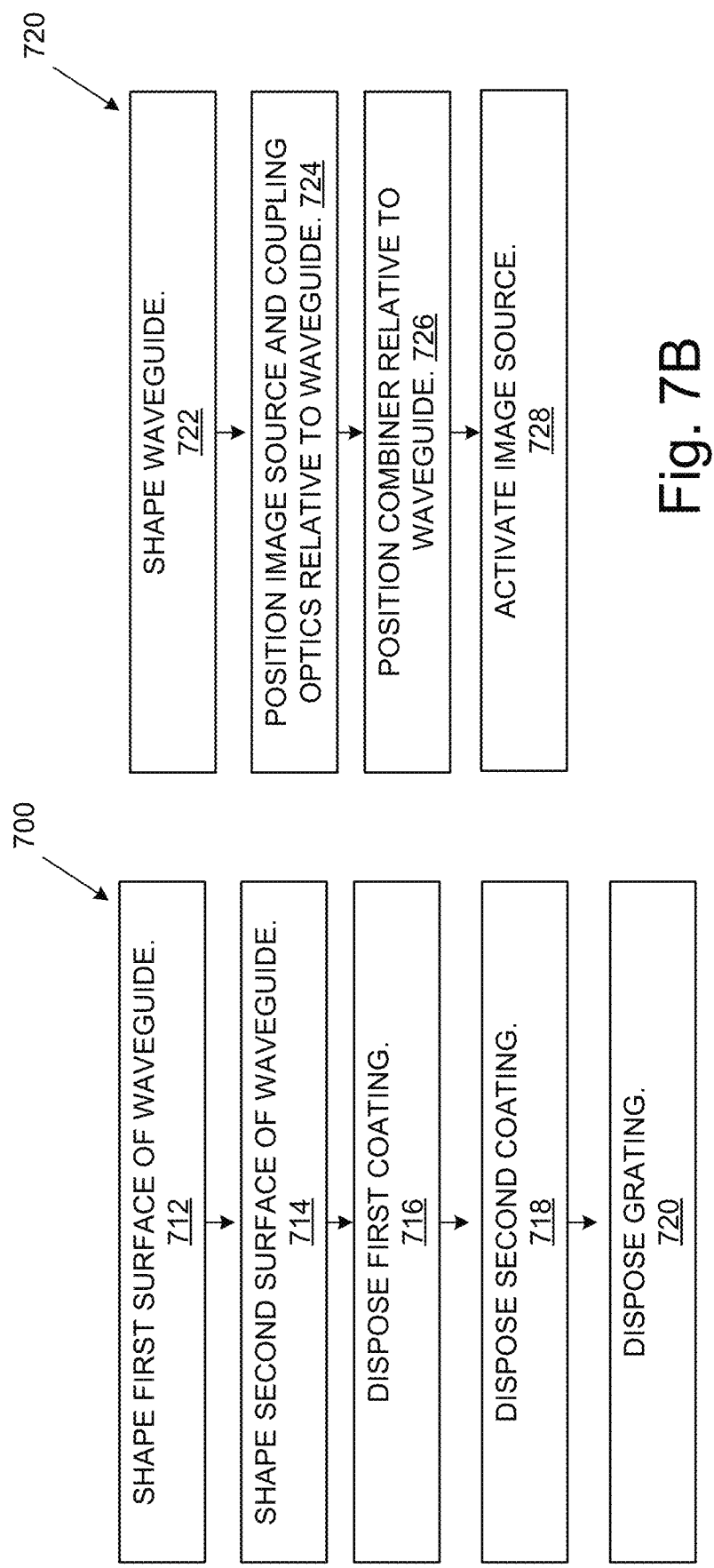

CURVED WAVEGUIDE FOR SLIM HEAD UP DISPLAYS

CROSS-REFERENCE TO RELATED APPLICATIONS

This application claims the benefit of U.S. Provisional Application No. 63/051,518 filed on Jul. 14, 2020 which is hereby incorporated herein by reference in the entirety.

TECHNICAL FIELD

This patent relates generally to head-up-displays (HUDs) that may be used in many applications, including in commercial and military avionic platforms. More particularly, embodiments of the disclosed technology relate to a new generation of digital display HUDs that utilize new compact optical subsystems.

DESCRIPTION OF THE RELATED ART

A head-up-display (HUD) is an optical projection device that forms an integral part of cockpit instrumentation on fixed and moving platforms including air, land, sea and underwater vehicles or platforms. HUDs are often found in manned vehicles as they provide information to vehicle operators or passengers. HUDs also have use on other sighting devices used, for example, in construction, land surveys and other such applications. For many platforms, the design of HUDs is challenged due to the availability of "cockpit" space and the length of the optical train needed to provide virtual imagery on the HUD that appears at the same distance as the "real world scene" that is being surveyed by the operator of the HUD. Specifically, in aircraft applications, the height of the HUD limits other instrumentation that the operator needs to view such as other cockpit or instrument controls.

BRIEF SUMMARY OF EMBODIMENTS

Embodiments of the systems and methods disclosed herein may configured to meet challenging performance requirements that may stem from the size of the HUD. Particularly, embodiments may utilize an optical waveguide to meet challenging performance requirements in a small overall size of the HUD. In addition, the disclosed technology presented herein is also applicable to Head Mounted Displays (HMDs).

The disclosed technology, according to various aspects, can include a coupler (coupling device), a waveguide, and a combiner. According to various embodiments of the disclosed technology a waveguide is disclosed that is configured to confine an input beam within the structure of the waveguide. The waveguide is configured to collimate the beam to be projected (e.g., through a combiner) to produce an image in infinity.

The disclosed technology may include a multifaceted waveguide with separate or discrete zones to control dispersion and optical power within a small form factor. The disclosed technology can be configured to produce an image at infinity by way of a collimated beam at an exit of the waveguide, with a small physical footprint.

A first (e.g., bottom) surface of the wave guide can be shaped such that the surface will reflect and simultaneously collimate the input beam. The first surface of the wave guide can be shaped such that the surface will reflect and simultaneously collimate the input beam in duplicity of discrete steps.

The first surface of the waveguide can be concave in one or more planes allowing for 1D or 2D minimization of the waveguide width.

A second surface of the waveguide opposite the first surface (e.g., a top surface) can be configured (e.g. it may have one or more portions of the surface accordingly defined) to compensate for chromatic and geometrical aberrations of the optical path.

According to various aspects of the disclosed technology, methods are disclosed for constructing a head up display that can achieve a low mechanical profile and provide optimal projection of imagery to the operator, by utilizing a blade waveguide concept.

According to various aspects of the disclosed technology, a waveguide is disclosed. A first portion of the waveguide can be configured to confine an input beam within the structure of the waveguide. A second portion of the waveguide can be configured to collimate the beam to be projected through a combiner, to produce an image in infinity.

In various embodiments, a first surface can be shaped with two or more convex profiles. The waveguide can be coupled to an image source. When coupled to an image source, the two or more convex profiles can convert an extracted uncollimated image into a collimated image. In some embodiments, the first surface is concave in two planes, allowing for 2D minimization of the waveguide width.

In some embodiments, a first portion and the second portion of the waveguide can meet at a junction point without any air or gluing gap. As such, the first surface can be noncontinuous and seamless. In some embodiments, the waveguide can include a plano-convex element. A first surface of the plano-convex element can be shaped with two or more convex profiles. In some embodiments, an extraction grating coupled to a planar side of the plano-convex element.

In some embodiments, a non-uniform transmission coating can be disposed between the extraction grating and the planar side of the plano-convex element. In some embodiments, a first surface can be shaped such that when coupled to an image source, the waveguide will reflect and simultaneously collimate an input beam in duplicity of discrete steps.

In some embodiments, the first surface is shaped such that when coupled to an image source, the waveguide will reflect and simultaneously collimate an input beam without the need of an injection grating or diffractive/holographic (optical) elements.

In some embodiments, the waveguide includes a second surface opposite the first surface, which is configured to compensate for chromatic and geometrical aberrations of an optical path.

According to various embodiments of the disclosed technology, a method for designing or shaping a waveguide is disclosed. According to various embodiments of the disclosed technology, a method for designing an optical system for a head up display is disclosed.

According to aspects of the present disclosure, a method of constructing an optical system for a head-up display is disclosed. Methods disclosed herein can include shaping a first waveguide element such that a first portion of the waveguide is configured to confine an input beam within the structure of the waveguide and a second portion of the waveguide is configured to collimate the input beam. Methods disclosed herein include coupling the waveguide to a combiner, such that the input beam combines to produce an image in infinity.

In some embodiments, a first surface of the second portion is shaped with two or more convex profiles. In various embodiments of methods disclosed herein, when the waveguide is coupled to an image source, the two or more convex profiles convert an extracted uncollimated image into a collimated image.

In some embodiments of methods disclosed herein, the first surface is concave in two planes, allowing for 2D minimization of the waveguide width.

In some embodiments, the first portion and the second portion meet at a junction point without any air or gluing gap, such that the first surface is noncontinuous and seamless at the junction point.

In some embodiments, the method further includes disposing a non-uniform transmission coating at a surface of the waveguide opposite the two or more convex profiles.

Methods disclosed herein according to aspects of the present disclosure, can include steps for disposing an extraction grating at the non-uniform transmission coating. The non-uniform transmission coating can be positioned between the extraction grating and the two or more convex profiles.

In various methods disclosed herein, the extraction grating and the non-uniform transmission coating are not disposed on the first portion of the waveguide. In various methods disclosed herein, the extraction grating and the non-uniform transmission coating are disposed on the second portion of the waveguide.

In methods disclosed herein, the first surface is shaped such that when coupled to an image source, the waveguide can reflect and simultaneously collimate an input beam without the need of an injection grating or diffractive/holographic elements.

Aspects of the disclosed technology can be applicable to HUD and HMD systems. Aspects of the disclosed technology can include HUD or HMD systems. The disclosed technology, according to various aspects, can include a coupler (coupling device), a waveguide, and a combiner. The waveguide can include one or more curved surfaces, which can be curved at one or more planes.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of the herein disclosure, and the scope of the invention is are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1A illustrates an example optical system for head up displays (HUDs), with which embodiments of the systems and methods disclosed herein may be implemented.

FIG. 1B shows another detail of an example optical system with corresponding ray tracing illustrating how the beam is propagating inside the curved waveguide, with which embodiments of the systems and methods disclosed herein may be implemented.

FIG. 7A illustrates an example method for constructing a curved waveguide, with which embodiments of the systems and methods disclosed herein may be implemented.

FIG. 7B illustrates an example method for constructing an optical system for a HUD as disclosed herein.

Figure 2B:
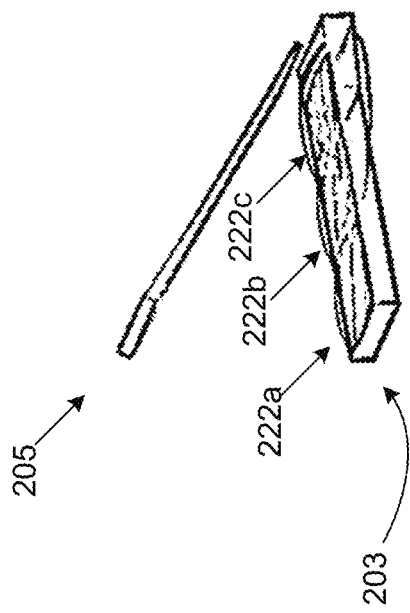
FIG. 2B illustrates another perspective of the detail view of FIG. 2A.

The figures are not exhaustive and do not limit the present disclosure to the precise form disclosed.

DETAILED DESCRIPTION

Embodiments of the systems and methods disclosed herein may include a novel optical waveguide design that adds an optical power to provide a simplified optical beam path in a more compact form factor.

In various embodiments, the waveguide may include a curved bottom waveguide profile. In various embodiments, the waveguide may resemble the cross section of a surfboard or other like surface, and as such may be referred to herein as a "SurfRider" or "curved waveguide." The curvature to the curved waveguide can be set to a desired degree of curvature and the curvature may be introduced in more than one plane allowing for precise light output control. The curvature across each of the one or more planes can have one or more radiuses of curvature. One advantage that might be achieved by embodiments of the Curved waveguide is the inclusion of the optical power into the waveguide structure, which can dramatically simplify the projection optics.

As previously alluded to, the disclosed technology can include a coupler (coupling device), a waveguide, and a combiner. FIG. 1A illustrates an example optical system 100 including projection optics 101, input light coupling subsystem 102, curved waveguide 103 (that includes top and bottom curvatures, which are shown in detail in FIG. 1B), output light coupling gratings 104 and beam combiner 105.

The image can be formed by a digital display, e.g. micromirror device 106, and delivered through collimating optics 107 to the curved waveguide 103. The input beam (partially shown as input beam 108 in figure) can be expanded and collimated inside the curved waveguide 103 and coupled out through a sequence of gratings on the top surface of the curved waveguide 103. The collimated beam can be reflected from the beam combiner 105 (reflected beam 109) and delivered to pilot. The image can be such that the image is scaled to present to the pilot or other operator of the HUD a picture that overlays the outside world in an exact 1:1 relationship. The optical system 100 can integrate with one or more other systems, such as cameras, avionics system, computers, the internet etc. Such other systems can be conventional HUD systems.

FIG. 1B shows a detail of the example optical system 100 with corresponding ray tracing illustrating how the beam is propagating inside the curved waveguide 103.

The bottom curved surface 120 can be highly reflective and can act similar to a distributed concave mirror reflecting the light to the top surface 122. Either or both bottom 120 and top 122 surfaces may have a distinct curvature. The bottom surface 120 may be curved to expand and collimate the input light, and the top surface 122 to compensate for chromatic and/or geometrical aberrations.

In some embodiments, the collimation projection lens can be eliminated by designing the curved waveguide curvature in two perpendicular planes. In some embodiments, the top surface of the waveguide can be planar with embedded coupling out optical gratings. These gratings may have variable efficiency to provide uniform light distribution. In other embodiments, the top surface can also be curved to provide additional design flexibility as well as compensation for chromatic and geometrical aberrations. Either or both top and bottom surface curvatures can be selected to provide wider total and instantaneous fields of view and increase overall light efficiency. The curved waveguide may be configured to offer an ultra slim profile and eliminate the projection optics. The curved waveguide top and bottom surfaces do not need to be continuous, but could have discrete zones (each of which may have their own unique curvatures) to improve optical efficiency of the waveguide.

The waveguide can be designed to have one or more properties. In some embodiments, the waveguide's bottom surface can use a combination of two or more discrete profiles—specifically freeform and planar. A first discrete profile of the bottom surface (freeform) can provide refractive properties, which will allow a coupling device to inject the image into the waveguide. This freeform profile can also have reflective properties (through either Snell's law or reflective coatings or a combination thereof) to transit the image through the waveguide.

A second discrete profile of the bottom surface (planar) can provide one or points of reflection of the image as it passes through the waveguide. These two discrete profiles can meet at a junction point without any air or gluing gap that provides a noncontinuous, yet seamless, bottom surface, e.g. bottom surface 120.

Somewhere within the waveguide there can exist a plane (that runs parallel to the direction of passed light) which has a non-uniform transmission coating and is immediately followed by a transmission extraction grating. As the image's light path falls incident on this coating, a portion of the image will be reflected along the light guide's bottom surface. The remaining portion of the light would be transmitted upwards towards the top surface (e.g. top surface 122). The coating can be non-uniform in nature so that the extracted images are relatively uniform in brightness. The extraction grating (transmissive by diffractive or holographic design) can provide multiple instances of an uncollimated image to be transmitted away from the bottom surface.

The waveguide's top surface can deploy an array of discrete powered profiles—specifically spherical or asphere (spheric or aspheric) in nature. An array of discrete plano-convex elements can reside atop the extraction grating's plane. The planar side of the plano-convex elements (convex profiles) can interface directly with the extraction grating. The convex profiles can convert the extracted uncollimated image into a collimated image.

Each discrete convex surface can have unique curvature properties, as compared to the previous profiles found along the array. This can compensate for the increase in optical path length for each tiled image. It can resemble a line of unbroken waves a surfer is often exposed to.

The extent to which the image is tiled within the waveguide will provide a larger viewing area (eye motion box or eyebox) than a single extraction aperture. In some systems, the HUD eyebox is 5-10 lateral by 3-5 vertical by 6-10 longitudinal inches. A pilot or other HUD operators can view the entire display if at least one of the pilot's eyes are within the eyebox.

If a waveguide has a large exit aperture, then it can provide an effectively large instantaneous field of view (iFOV), far eye relief, and a wide viewing plane (to see a given image generated from an image source). Waveguides are thin and therefore can only provide a larger exit aperture if the waveguide can successfully replicate the image through multiple impressions. This copying or tiling phenomena can expand the exit aperture (by tiling many smaller apertures together), and is possible in part to beam-splitting coatings. As such, an uncollimated image can be tiled.

Figure 2A:
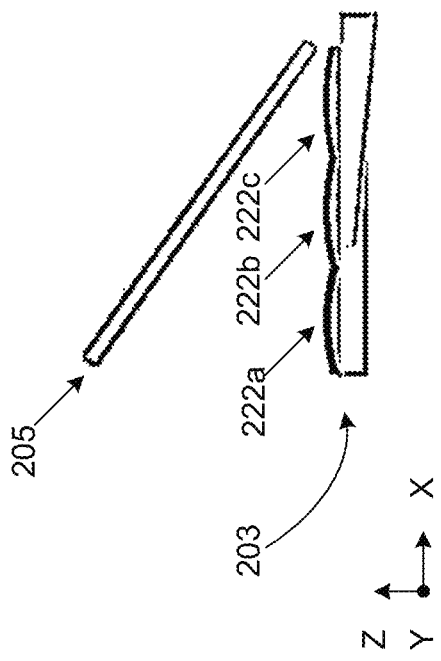
FIG. 2A illustrates an example detail view of a curved waveguide as well as beam combiner with which embodiments of the systems and methods disclosed herein may be implemented.

FIGS. 2A and 2B (another perspective of FIG. 2A) show an example detail of a curved waveguide 203 as well as beam combiner 205. As previously alluded to, the surfaces of the waveguide can be curved. These surfaces can be at least partially smooth, or not. As one example of a surface that is not smooth, the curved waveguide can have a top surface that includes more than one curved surface. For example, three surfaces 222a, 222b, 222c, that make up the top surface are shown in FIG. 2A and FIG. 2B. The sub-surfaces that make up the surfaces can make up zones, which control propagation of light and optimize performance of system.

In some embodiments, the waveguide has a length of 100 mm to 3000 mm, although embodiments may have other lengths. For example, the waveguide can have a length (e.g. in the X direction shown in FIG. 2A) of 200 mm. Each of the curvatures can have a base length of equal or unequal lengths. It can be understood that when shown in cutaway detail perspective, each of the curved surfaces can have one or more apices, wherein the apex can have the same or different heights relative to a midline or baseline (or base) of the curved surface. In some embodiments, each of the curved surfaces can have different radius of curvature.

In some embodiments, the peak or apex of the curvatures can follow a peak line. The peak line itself is curved (e.g. meanders or snakes along the Y, X, and/or Z direction). In some embodiments, the multiple surfaces can allow for tiling the uncollimated image.

The array of exit collimating reflectors can be manipulated so that the angle of incidence leaving the collimated image is narrower than the AOI of the uncollimated image path (as it leaves the waveguide's top surface). This can allow for effectively increasing the transmission efficiency of each tiled image. This can allow for blocking certain angular frequencies from ever reaching the extraction grating and causing unwanted artifacts within the wide viewing plane.

Figure 3B:
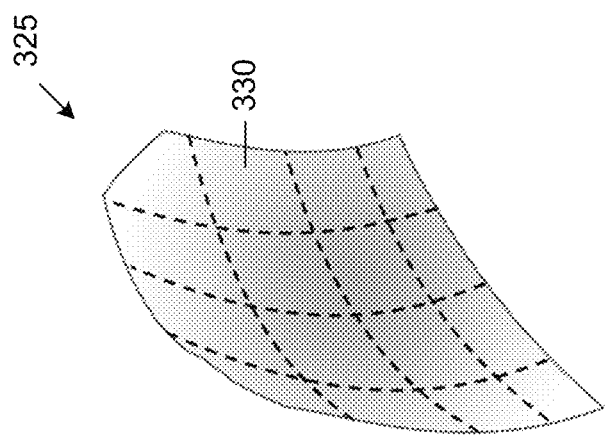
FIG. 3B illustrates an example combiner with which embodiments of the systems and methods disclosed herein may be implemented.
Figure 3A:
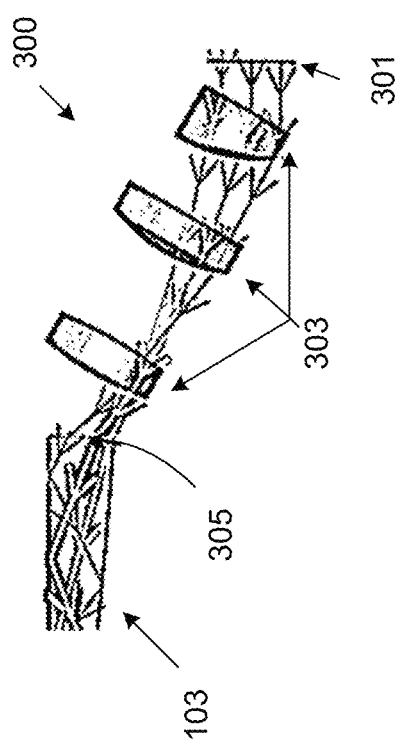
FIG. 3A illustrates an example operation of a coupler, by way of ray tracing, that includes a coupling device that couples to a waveguide, with which embodiments of the systems and methods disclosed herein may be implemented.

As previously shown with reference to FIGS. 1A-1B, the disclosed optical system can include a coupler. FIG. 3A shows an example ray tracing within an optics system that includes coupler or coupling device 300 and waveguide (waveguide 103 shown as an example). The coupling device 300 can include an image source 301 (phase plate, diffuser) and refractive optics 303. The image source 301 can emit a flux (e.g. symmetric flux) into a system of refractive coupling optics (refractive optics 303). The beam may have a small angular distribution (e.g. 1, 2, 3, 5, 7, 8, 10, etc. degree cone).

The refractive optics 303 may include one or more prism elements, such as wedge-prism elements. Each of the prism elements may have different shapes or profiles, and the spacing can be uniform or non-uniform. The refractive optics 303 may help inject 305 a perpendicular image source (or substantially perpendicular, e.g. to within 0.01 to 30 degrees of perpendicular) into the waveguide (waveguide 103 shown) so that the refracted path is internally reflected without the need of an injection grating or diffractive/holographic optical elements (DOES/HOEs). Injection 305 of the beam into the waveguide 203 can be through refraction and total internal reflection (TIR). The beam can be reflected within the waveguide 103 due to TIR.

As previously alluded to, for example with reference to combiner 105, an optical system for a HUD can include a combiner. Referring to FIG. 3B, an example combiner 325 is shown. Combiner 325 can be both curved and tiled such that each tile 330 can have a different freeform curvature, for added design optimization means. Each tile 330 can have different size. Combiner 325 is merely shown as an example combiner referred herein.

Figure 4:
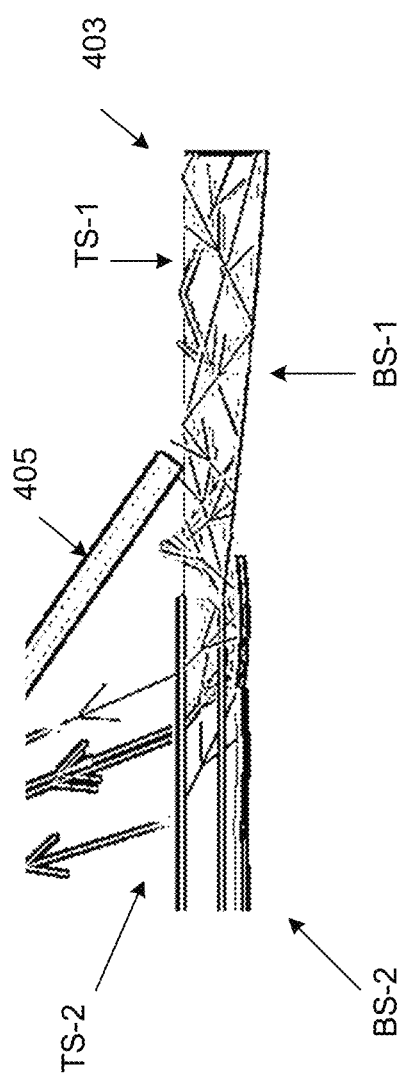
FIG. 4 illustrates an operation of an optical system as disclosed herein, by way of ray tracing through a waveguide, with which embodiments of the systems and methods disclosed herein may be implemented.
Figure 5A:
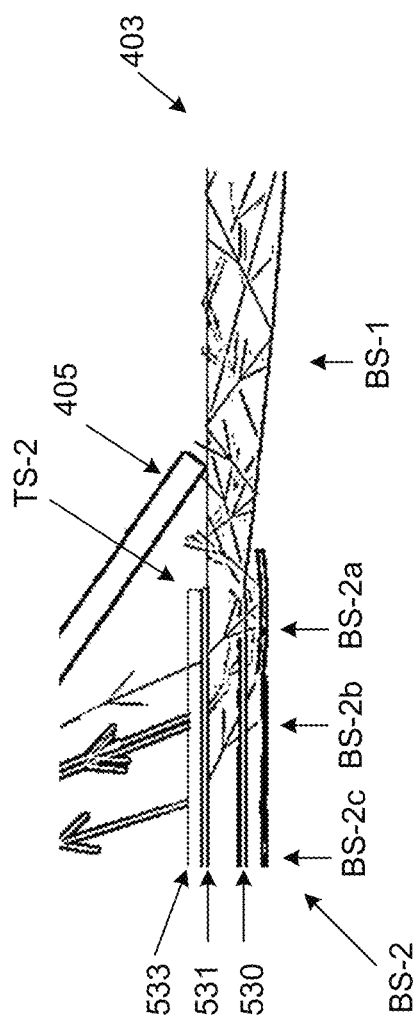
FIG. 5A illustrates an operation of an optical system as disclosed herein, by way of ray tracing through a waveguide that has a first region for injection-transfer, with which embodiments of the systems and methods disclosed herein may be implemented.
Figure 5B:
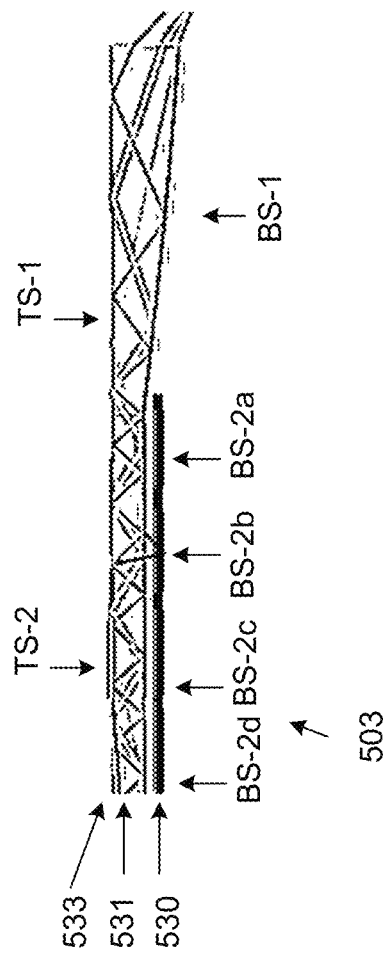
FIG. 5B illustrates an operation of an optical system for HUDs as disclosed herein, by way of ray tracing through a waveguide that has a first region for injection-transfer and a second collimation-extraction region, with which embodiments of the systems and methods disclosed herein may be implemented.
Figure 5C:
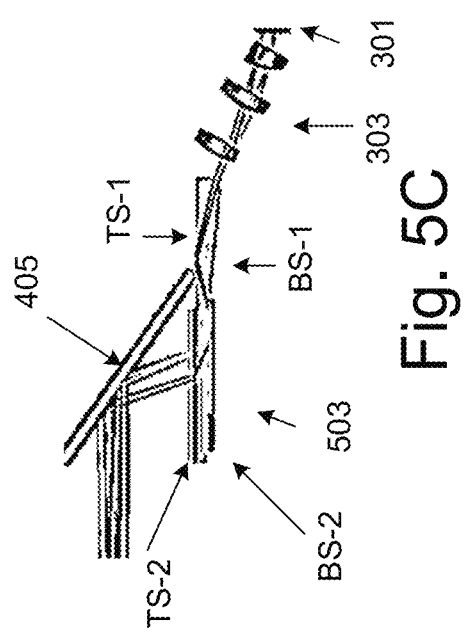
FIG. 5C illustrates an operation of an optical system for HUDs as disclosed herein, by way of ray tracing through a coupler, waveguide, and combiner, with which embodiments of the systems and methods disclosed herein may be implemented.
Figure 5D:
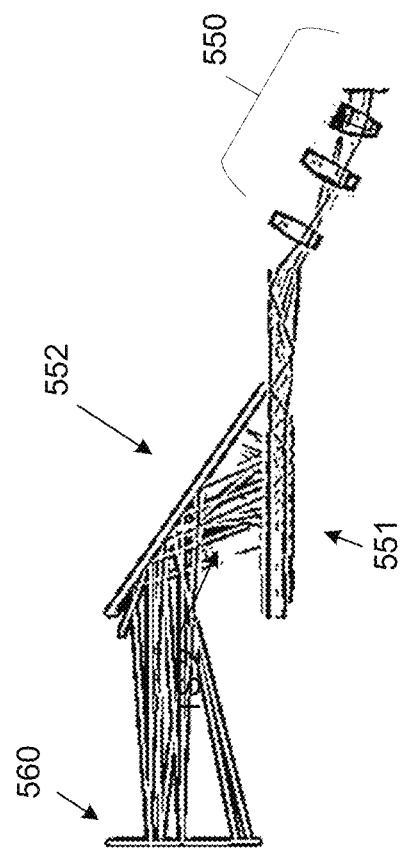
FIG. 5D illustrates an operation of an optical system for HUDs as disclosed herein, by way of ray tracing through a coupler, waveguide, and combiner, with which embodiments of the systems and methods disclosed herein may be implemented.

FIGS. 4-5D show various regions of the example waveguide in detail.

Figure 6:
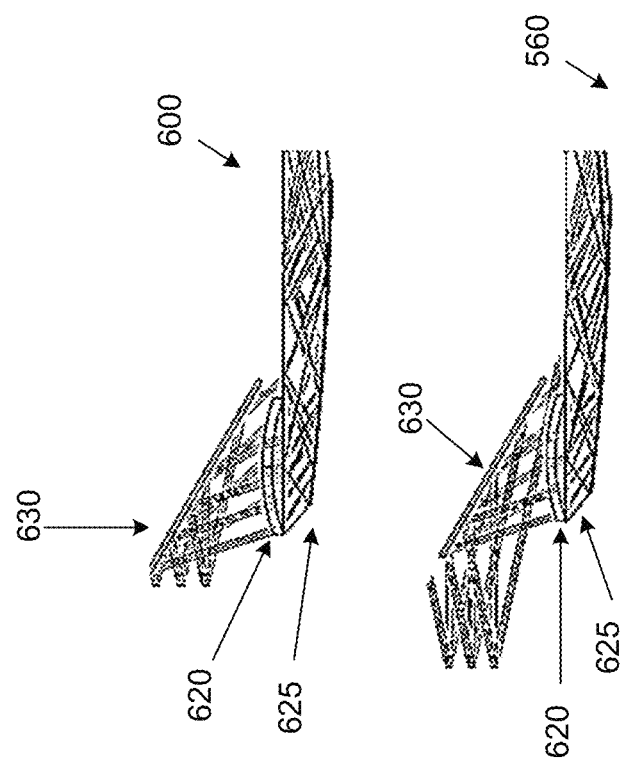
FIG. 6 illustrates a reversed optical system for HUDs, with which embodiments of the systems and methods disclosed herein may be implemented.

FIGS. 4-6 show various regions of the example waveguide in detail. The waveguide illustrated in this example is divided into two regions, a first Injection-Transfer Region; and a second Collimation-Extraction region.

FIG. 4 shows a ray trace through a waveguide 403, wherein the beams pass through the waveguide 403 to combiner 405. The light passed in from the coupling optics (not shown in FIG. 4, but can be as coupling optics 303 shown in FIG. 3A) is refracted upwards and into the waveguide's 403 planar top surface, first region (TS-1). The light can then, at the planar top surface, reflect downwards and to the first region of the waveguide's bottom surface (BS-1). The waveguide's 403 planar top surface, second region (TS-2) and the waveguide's 403 bottom surface, second region (BS-2) will be explained in detail with reference to FIGS. 5A-6.

The first region can correspond to an injection region (generally the right side of the FIG. 4). BS-1, in general can be a convex refractive surface, but with an applied axial-symmetric profile, that is freeform in nature. The light reflects up and off BS-1, thus traveling again towards TS-1. The light is transmitted through the waveguide 403 through a collection of bounces along TS-1 and BS-1. It finally leaves the waveguide's first region and enters the second region.

Referring to FIGS. 5A-B and 6, the light leaving the first region (e.g. with reference to FIG. 4) enters the second region. It travels down towards the bottom surface (BS-2). As previously alluded to with reference to FIG. 4, prior to BS-2 there exists a plane within the waveguide with partial reflectivity and partial transmittivity. The transmitted light passes onto BS-2. BS-2 is an array of collimating exit apertures with reflective properties (through either Snell's law or coatings). Each element within the array can be used to collimate a particular emittance angle. BS-2 is made up of discrete profile reflectors, shown as BS-2a, BS-2b, BS-2c in FIG. 5A. Although profile reflectors BS-2a, BS-2b, BS-2c are shown in FIG. 5A, any number or type of reflectors can be used. The profile reflectors or portions of BS-2 can be physical material (e.g. curved or otherwise warped) or deposited material to change the optical properties (such as the index of refraction).

As shown with reference to FIG. 5A, the waveguide can include a first non-uniform transmission coating (R/T coating) 530, a second non-uniform R/T coating 531, and a non-uniform extraction grating 533.

The optical waveguide with free form mirrors and/or free form surfaces can substitute large size relay lenses in the HUD and reduce the cost at injected molding fabrication. Convectional HUDs are generally large and expensive because of implementation of large relay lenses to form a large field of view (FOV) over a large eyebox, while simultaneously to provide low display parallax and high display accuracy. The present disclosure allows for compact and low-cost HUDs, which can be advantageous for various applications including, for example, small aircraft where cockpit space is constrained, and for cars to fit the central console or dashboard of a vehicle.

The present invention, allows for a low-profile optical engine that can fit within the cockpit or console available space. Implementation of a freeform waveguide can provide an ultra slim HUD engine while expanding the eye box. It can provide keystone corrected imaging and thereby avoids complex and bulky corrective optical components. It also avoids the need for spatially separated freeform mirrors require a room for separation and mounts in the console.

The beamsplitter from non-uniform reflective/transmissive coating is assigned to increase HUD eyebox in the vertical direction. The non-uniform reflective/transmissive coating can be deposited directly on the top surface of the optical waveguide.

The waveguide can be accomplished by a transflective mirror array deposited with layers of coatings to generate a different reflection/transmission ratio to guarantee the uniformity of output light across the whole eye box.

The optical waveguide can be accompanied with a beamsplitter used the non-uniform surface relief slanted diffractive grating or blazed diffractive grating to maximize projection of the collimated light onto the beam combiner. The grating can be fabricated by inject molding, or by nanoimprinting.

The beamsplitter can be composed from the non-uniform volumetric holographic grating from a photopolymer or mix of the liquid crystals with polymer.

The non-uniform gradient-index (grin) beamsplitter allows to (1) separate the incident light in fast and slow polarization components, (2) transport the fast components to the beam combiner (e.g. combiner 405 shown in FIGS. 4-5A) (3) increase propagation path in the waveguide for the slow component, (4) convert the slow component into the fast one and (2) transport the fast component in upper area of the beamcombiner increasing eyebox in vertical direction with a minimal power loss.

Referring to FIG. 5B, waveguide 503 is shown with details of the operation of the collimation extraction region, by way of ray tracing. At the bottom plane with partial reflectivity and transmittivity, the reflected light is shown. The uncollimated image's light will travel through the waveguide 503, via bouncing between the TS-2 non-uniform R/T coating 531 and the internal plane's non-uniform R/T coating 530. At each bounce along the internal plane, an instance (or tile) of the image is transmitted to a new array element (or portion of BS-2, profile reflectors BS-2a, BS-2b, BS-2c, BS-2d shown). This reflector effectively collimates the image. The angle at which the image passes upwards towards TS-2 is different than the angle at which the uncollimated image bounces through the waveguide. This allows the TS-2's non-uniform R/T coating to be selective in transmitting this now tiled-then-collimated image onto the extraction grating. Each reflector profile found on BS-2 (e.g. the profiles of portions of BS-2) is designed to incorporate the additional path length between the penultimate and final powered apertures. Glare shield will capture all higher orders of extracted images.

An example of an integrated operation of the coupler, the waveguide and the combiner is shown in FIG. 5C and FIG. 5D.

Putting FIGS. 4, 5A, 5B into context, FIG. 5C shows another detail of ray tracing at an optical system for HUD, including a coupler (image source 301 and refractive optics 303 shows as examples), waveguide 403, and combiner 405. The waveguide 403 can be waveguide 403 shown with reference to FIGS. 5A-5B (e.g. with BS-2 having profile reflectors BS-2a, BS-2b, BS-2c, as well as various coatings 530, 531, 533 previously described).

FIG. 5D shows another example optical system 550 and its operation (by way of ray tracing) for HUDs that can include coupler 550, waveguide 551 and combiner 552. Coupler 550 include one or more components shown in FIG. 3A, combiner 552 can include combiner 325 shown in FIG. 3B. Waveguide 551 can include waveguides 103, 403, 503 shown with reference to FIG. 1A-1B, FIG. 4-5C. A projection 560 can be projected onto a portion of the HUD, such as a transparent display. The image can be projected through the combiner to infinity.

A reversed or inverted optical system may work in a similar way to the above example embodiments. For example, it can be understood that profile reflectors can be created at a top surface instead of a bottom surface of the waveguide (i.e. positioned closer to the combiner than an opposite surface of the waveguide). FIG. 6 shows an example of a reversed optical system 600 with an array 620 of refractive final collimation components, waveguide 625, and combiner 630. Although the array 620 is shown separately, it is understood it can be one with the waveguide 625. It can also be understood that one or more couplers can follow the combiner (e.g. in order, coupler, waveguide, combiner, followed by coupler).

A method for designing an optical system for HUDs can include steps for designing a waveguide, coupler, and combiner as disclosed herein with reference to FIGS. 1-5C. A method for designing an optical system for HUDs can include combining for example coupler with waveguide as disclosed herein.

FIG. 7a shows an example method for designing a curved waveguide as disclosed herein. A method 700 for designing a curved waveguide can include a step 712 for shaping a first surface of the waveguide. The method for designing a curved waveguide can include a step 714 for shaping a second surface of the waveguide. The second surface can be opposite the first surface. The method can include disposing one or more uniform or non-uniform coatings or gratings as disclosed herein. For example, the method can include step 716 for disposing a first non-uniform R/T coating at the bottom or first surface. The method 700 can include step 718 for disposing a second non-uniform R/T coating at the top or second surface.

The waveguide can be shaped such that a beam injected into the waveguide can be guided at least partially through the waveguide through refraction and total internal reflection (TIR). The first surface and the second surface can be such as shown with reference to FIG. 3A-FIG. 6. For example, each of the first surfaces can include one or more portions and elements discussed with reference to waveguide 403. The method 700 can include a step for disposing a non-uniform extraction grafting at the second non-uniform R/T coating. The first and second non-uniform R/T coating can be such as disclosed with reference to FIG. 4-5C. The non-uniform extraction grafting can be such as disclosed with reference to FIG. 4-5C.

A method 720 for constructing an optical system for HUDs can include a step 722 for shaping a waveguide. The waveguide can be shaped such that a beam can be confined (at least partially) within the structure of the waveguide, and such that the beam is collimated. The waveguide can be shaped with a first region configured for guiding a beam (Injection-Transfer Region) and a second portion configured for collimation and extraction of the beam (collimation-extraction region). The waveguide can be shaped with reference to waveguides disclosed herein, such as waveguide 403. Shaping the waveguide (e.g. by additive and/or substrative manufacturing) can include disposing one or more elements at the waveguide such as coatings and/or gratings. The method 720 for constructing the optical system can include step 724 for positioning a coupler, which can include an image source and/or coupling optics, proximate to the shaped wave guide. The coupler can be positioned such that a beam is injected perpendicularly (or substantially perpendicularly) into the waveguide so that the refracted path of a beam within the waveguide is internally reflected without the need of an injection grating or diffractive/holographic optical elements (DOES/HOEs). The method 720 can include step 726 for positioning a combiner relative to (e.g. proximate to) the waveguide. The combiner can be combiner shown in FIG. 3B. The combiner can be positioned such that an image is produced in infinity based on a beam inputted from the waveguide towards the combiner, when the image source is activated. As such, the method can include step for activating an image source 728.

A method for constructing a HUD can include integrating the optical system (e.g. with reference to method 720 for constructing the optical system) with a HUD. Steps shown herein in FIGS. 7A-7B need not be performed in order, and the methods 700, 720 can be performed without one or more depicted steps.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A waveguide, comprising:
   a top surface, wherein the top surface is shaped to have a first curvature; and
   a bottom surface shaped to receive light from an input beam that is reflected downwards from the top surface, the bottom surface comprising:
   a first portion configured to confine the input beam within the structure of the waveguide, and
   a second portion configured to collimate the beam to be projected through a combiner, to produce an image in infinity, wherein the bottom surface is shaped to have a second curvature that is distinct from the first curvature.

2. The waveguide of claim 1, wherein the second curvature of the bottom surface comprises two or more convex profiles.

3. The waveguide of claim 2, wherein the waveguide is coupled to an image source such that the two or more convex profiles convert an extracted uncollimated image into a collimated image.

4. The waveguide of claim 2, wherein the bottom surface is concave in two planes, allowing for 2D minimization of the waveguide width.

5. The waveguide of claim 2, wherein the first portion and the second portion meet at a junction point without any air or gluing gap, such that the bottom surface is noncontinuous and seamless.

6. The waveguide of claim 1, further comprising:
   a plano-convex element, wherein a surface of the plano-convex element is shaped with two or more convex profiles; and
   an extraction grating coupled to a planar side of the plano-convex element.

7. The waveguide of claim 6, further comprising a non-uniform transmission coating disposed between the extraction grating and the planar side of the plano-convex element.

8. The waveguide of claim 1, wherein the bottom surface is shaped such that when coupled to an image source, the waveguide will reflect and simultaneously collimate the input beam in duplicity of discrete steps.

9. The waveguide of claim 1, wherein the bottom surface is shaped such that when coupled to an image source, the waveguide will reflect and simultaneously collimate the input beam without the need of an injection grating, diffractive element, or holographic elements.

10. The waveguide of claim 1, wherein the top surface is arranged opposite the bottom surface and is configured to compensate for chromatic and geometrical aberrations of an optical path.

11. A method of constructing an optical system for a head-up display, comprising:
    shaping a top surface, wherein the top surface is shaped to have a first curvature; and
    shaping a bottom surface to receive light from an input beam that is reflected downwards from the top surface, and such that a first portion of the waveguide is configured to confine an input beam within the structure of the waveguide, and a second portion of the waveguide is configured to collimate the input beam, wherein the bottom surface is shaped to have a second curvature that is distinct from the first curvature.

12. The method of claim 11, further comprising coupling the waveguide to a combiner, such that the input beam combines to produce an image in infinity.

13. The method of claim 11, wherein the second portion is shaped with two or more convex profiles.

14. The method of claim 13, wherein when the waveguide is coupled to an image source, the two or more convex profiles convert an extracted uncollimated image into a collimated image.

15. The method of claim 13, wherein the bottom surface is concave in two planes, allowing for 2D minimization of the waveguide width.

16. The method of claim 13, wherein the first portion and the second portion meet at a junction point without any air or gluing gap, such that the bottom surface is noncontinuous and seamless at the junction point.

17. The method of claim 13, further comprising disposing a non-uniform transmission coating at a surface of the waveguide opposite the two or more convex profiles.

18. The method of claim 17, further comprising disposing an extraction grating at the non-uniform transmission coating such that the non-uniform transmission coating is positioned between the extraction grating and the two or more convex profiles.

19. The method of claim 18, wherein the extraction grating and the non-uniform transmission coating are not disposed on the bottom portion of the waveguide.

20. The method of claim 11, wherein the bottom surface is shaped such that when coupled to an image source, the waveguide will reflect and simultaneously collimate the input beam without the need of an injection grating, diffractive elements, or holographic optical elements.

* * * * *